United States Patent Office 3,047,589
Patented July 31, 1962

3,047,589
PREPARATION OF SUBSTITUTED PERCHLORYL-
AROMATIC COMPOUNDS
Francis Leslie Scott, Elkins Park, Pa., assignor to Pennsalt Chemicals Corporation, Philadelphia, Pa., a corporation of Pennsylvania
No Drawing. Filed Sept. 23, 1959, Ser. No. 841,684
9 Claims. (Cl. 260—349)

This invention relates to a process for the preparation of substituted perchlorylaromatic compounds.

Perchlorylaromatic compounds are prepared according to the method described by Inman, Oesterling, and Tyczkowski, J. Am. Chem. Soc., 80, 5286 (1958), and in copending application of Inman et al. Serial No. 762,906, filed September 24, 1958. The compounds are useful as explosives and as intermediates for the preparation of compounds useful as dyes.

Inman et al., in their paper, above, disclose that perchlorylaromatic compounds are stable at ordinary temperatures in neutral or acid media, but that in strongly alkaline solutions the compounds are hydrolyzed rapidly to phenols and chlorate ion, according to the following equation:

$$Ar\text{—}ClO_3 + NaOH \rightarrow Ar\text{—}OH + NaClO_3 \qquad (1)$$

Inman et al. in their patent application disclose that usually only mildly alkaline conditions can be tolerated for short periods of time by perchlorylaromatic compounds. They describe these conditions as being below a pH which is high enough to cause removal of the perchloryl radical. One would therefore expect that use of a strongly alkaline condition is to be avoided in reactions involving perchlorylaromatic compounds.

I have now discovered that if a perchlorylaromatic compound has a halogen atom substituted in the aromatic ring in ortho or para position with respect to the perchloryl group, upon treating the compound under even highly alkaline conditions with up to about a stoichiometric amount of a base (i.e., a material donating electrons under the broad Lewis concept), metathesis occurs and the halogen atom on the ring is replaced by the base without removal of the perchloryl radical.

The reaction is illustrated by the following Equation 2 in which 4-fluoroperchlorylbenzene and sodium methoxide in methanol are used by way of example:

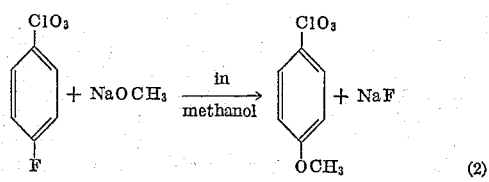

The significance of this discovery is emphasized by the fact that from standard physical chemistry calculations of the relative rates of attack of bases on substituents on the nucleus of a benzene ring it is found that the rate of attack of a base on the perchloryl radical of perchlorylbenzene, for example, as illustrated by Equation 3, is about $10^4$ times more rapid than the rate of attack on the fluorine atom of fluorobenzene, as illustrated by Equation 4:

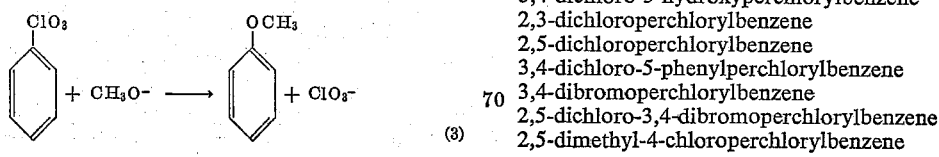

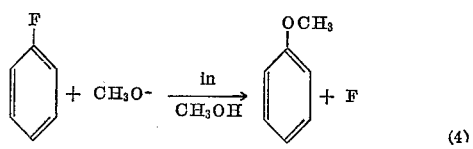

One would therefore expect, contrary to my discovery, that based on the teachings of Inman et al., above, and from the calculated rates of attack on the respective substituents by a base, that upon treating a halogen-substituted perchlorylaromatic compound with a base the perchloryl radical would be removed about ten thousand times more rapidly from the compound than is the halogen atom. This expected, but not attained, result is illustrated with 4-fluoroperchlorylbenzene and methoxy radical in Equation 5.

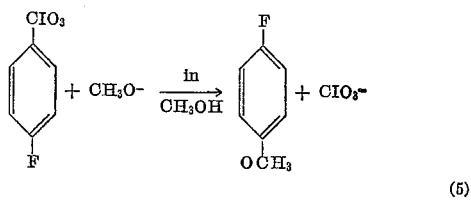

Instead, I have found that the result depicted by Equation 2, above, is obtained.

A similar series of displacements as those of Equation 2 occur with the ortho-perchlorylaromatic compounds as shown in Equation 6:

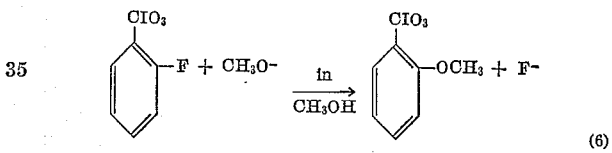

The method of my invention comprises treating a halogen-containing perchlorylaromatic compound having a halogen atom in ortho or para position on the ring with respect to the perchloryl group with up to about a stoichiometric amount of a base at a temperature below the decomposition points of the perchlorylaromatic compounds involved. The halogen can be fluorine, chlorine, bromine, or iodine. Preferably it is fluorine. Typical ortho- and para-haloperchlorylaromatic compounds to which the method of this invention can be applied are disclosed in the above copending application. They include, but are not limited to, the following list of compounds, which is given by way of example:

4-fluoroperchlorylbenzene
4-chloroperchlorylbenzene
2-chloroperchlorylbenzene
4-bromoperchlorylbenzene
4-iodoperchlorylbenzene
2-chloro-5-aminoperchlorylbenzene
2-chloro-5-nitroperchlorylbenzene
3,4-dichloroperchlorylbenzene
2,3,5-trichloro-4-fluoroperchlorylbenzene
2-methyl-3,4,5-trichloroperchlorylbenzene
2,3,4,5,6-pentachloroperchlorylbenzene
2,5-difluoro-3,4-dichloroperchlorylbenzene
2,5-difluoroperchlorylbenzene
3,4-dichloro-5-hydroxyperchlorylbenzene
2,3-dichloroperchlorylbenzene
2,5-dichloroperchlorylbenzene
3,4-dichloro-5-phenylperchlorylbenzene
3,4-dibromoperchlorylbenzene
2,5-dichloro-3,4-dibromoperchlorylbenzene
2,5-dimethyl-4-chloroperchlorylbenzene 2,5-dichloro-3-fluoroperchlorylbenzene
3,4,5-trichloroperchlorylbenzene
2-iodo-3,4,5-trichloroperchlorylbenzene
2,4,5,6-tetrachloro-2-fluoroperchlorylbenzene For ease of presentation in the remainder of this disclosure the term haloperchlorylaromatic compound will be used to refer to both the ortho- and para-haloperchlorylaromatic compound when the remarks apply to both. It is to be understood that other substituents besides the halogen can be present on the aromatic ring, as is clear from the above list, and the term haloperchlorylaromatic compounds also includes compounds of such type.

The base used in practicing this invention can be one of the broad class of compounds recognized as bases or nucleophiles in organic synthesis work, i.e., essentially electron donating substances, whether this donation be to a proton, or to a carbon atom. Examples of such basic substances include alkali metal hydroxides, such as sodium hydroxide, potassium hydroxide, lithium hydroxide; alkali metal azides, such as sodium azide, potassium azide, lithium azide; aliphatic alcohols such as methanol, ethanol, propanols, butanols, pentanols, hexanols, and preferably their alkoxides; alkanethiols (mercaptans) such as methanethiol, ethanethiol, propanethiols, butanethiols, pentanethiols, hexanethiols, and preferably their mercaptides; primary alkylamines, such as methylamine, ethylamine, propylamines, butylamines, amylamines, hexylamines; secondary alkylamines, such as dimethylamine, diethylamine, dipropylamines, dibutylamines, diamylamines, dihexylamines; tertiary alkylamines, such as trimethylamine, triethylamine, tripropylamines, tributylamines, triamylamines, trihexylamines; diamines, such as trimethylene-diamine, ethylenediamine, hexamethylenediamine; aromatic alcohols such as benzylalcohol, phenylethylalcohol, and preferably their phenylalkoxides; phenols, such as hydroxybenzene, cresols, thymol, o-xenol, catechol, resorcinol, naphthols, hydroquinone, pyrogallol, phloroglucinol, and preferably their phenolates; thiophenols, such as benzenethiol and substituted benzenthiols, thiocresols, and preferably their benzenethiolates; aromatic amines, such as aniline and substituted anilines, benzylamine, diphenylamine, diethylbenzylamine, naphthylamines, phenylenediamines, toluidines, xylidines, benzedrine, benzidine, p-aminophenol, p-phenetidine, aminoanthraquinones; heterocyclic amines such as pyrrole, pyrrolidine, pyrazole, pyrazoline, pyrazolone, antipyrine, indole, indoxyl, indigo, skatole, pyridine, piperidine, quinoline, isoquinoline, acridine, carbazole, atabrine, chrysaniline; alkaloids such as coniine; sulfur-nitrogen compounds which can form a basic anion in solution, such as sulfanilamide, sulfapyridine, sulfathiazole, sulfadiazine, sulfaguanidine, o-toluenesulfonamide; hydrazine and substituted hydrazines, such as methylhydrazines, phenylhydrazine, naphthylhydrazines, tolylhydrazines, xylylhydrazines; hydroxylamine derivatives, such as methoxyamine, ethoxyamine, methylhydroxylamine, ethylhydroxylamine; urea and substituted ureas, such as methylurea, ethylurea, dimethylureas, diethylureas, ethanoxylurea, diethanoylureas; guanidine and substituted guanidine, such as 1,3-dimethylguanidine; hydrazides, such as acethydrazide; imides, such as succinimide, phthalimide, and preferably their alkali metal salts; amidines, such as acetamidine, propionamidine, butyramidine; amidoximes, such as acetamidoxime, propionamidoxime, butyramidoxime; and anions of weak acids, such as $-CN$, $ONO^-$, $=S$, $-CNO$, $-NCO$, $-N_3$, $-CNS$, $-NCS$, $-OCOCH_3$, $S_4^{-2}$, $-SH$, $CO_3^{-2}$, $S_2O_3^{-2}$, $HCO_3^-$.

A stoichiometric amount of base is needed for complete reaction to occur. Any excess above this amount should be avoided, unless some loss in perchloryl compound can be accepted. The quantity of base used in practicing the invention is critical from the standpoint that presence in the reaction mass of an amount of strong base in excess of the stoichiometric quantity needed will remove the perchloryl radical after the para-halogen atom has been removed. Accordingly, the amount of base present in the reaction mass should preferably be kept below the stoichiometric amount needed. When the endpoint of the reaction is being approached, additional base can be added slowly to obtain the optimum degree of conversion of the haloperchlorylaromatic compound to the new ortho- or para-substituted compound without exceeding the endpoint. When a weak base, such as ethanol, is used as a solvent in combination with strong base, such as sodium ethoxide, the amount of sodium ethoxide used may still be up to about the stoichiometric amount needed. The reason for this is that the ethanol, being a weak base, does not attack the halogen at a significant rate, whereas the attack of the ethoxide group on the halogen atom proceeds rapidly, by comparison. Thus, while both the alcohol and alkoxide are bases, the alkoxide, in most cases, will be the principal or only reactive base during the period that contact is maintained. In such case, it is the total amount of this higher reactive base which must be limited to a stoichiometric amount.

In some replacement reactions carried out according to this discovery, the base, e.g., methanol, is advantageously first modified by converting it to a more reactive base, e.g., methoxide ion, by treatment with an active metal such as sodium. The displaced halogen ion from the haloperchlorylaromatic compound is then also conveniently removed in a non-corrosive form as a salt. In most cases, this embodiment of the invention is carried out by adding the base to the reaction vessel in the form of an alkali metal salt. For example, when an alcohol, phenol, alkanethiol (mercaptan) or weak acid material is used as the source of basic anion, the base is preferably added to a liquid medium in the reaction vessel in the form of its alkali metal salts, e.g., methanol as sodium methoxide, phenol as sodium phenolate, benzenethiol as sodium benzenethiolate, hydrogen cyanide as sodium cyanide.

The degree of alkalinity of the reaction mass is dependent on the degree of dissociation of the base in the liquid of the reaction mass, when the basic material is one that dissociates, as $Na_2CO_3$. The lower limit of this degree of alkalinity is a degree at least high enough to ensure substantially complete dissociation of the reactants in the solution medium. The upper limit is not critical and is advantageously kept close to the minimum alkalinity required, but can be higher. The degree of alkalinity is not a critical condition but rather is a condition which results from the general basicity of the reaction mass, which in turn is influenced by the base reactant used and its amount in the mass.

Any degree of alkalinity such as is ordinarily met in organic synthesis can be tolerated by the haloperchlorylaromatic compound in the reaction mass so long as the stoichiometric amount of base is not exceeded. The newly-formed ortho- or para-substituted perchlorylaromatic compound is usually stable under a mildly alkaline condition, but could be deperchlorylated in the presence of a strong base. It is therefore necessary, in some cases, to isolate the newly-formed material from the reaction mass as soon as the reaction is completed. Some ortho- or para-substituted perchlorylaromatic compounds can withstand attack by a strong base better than others, and the rate at which the isolation is carried out will accordingly vary. The isolation can be carried out, for example, by rapid dilution of the reaction mass by pouring it into acidified water.

The reactions of this invention are advantageously carried out in a solvent or liquid diluent. Although use of an added solvent or diluent is not usually critical to the practice of the invention, particularly if the base is a liquid in which the haloperchlorylaromatic compound is soluble, use of a liquid dispersing medium becomes necessary when both the reactants are solids. Additionally, use of a liquid medium is desirable to promote heat removal and thus avoid heating the perchlorylaromatic compounds to a decomposition temperature in the course of practicing the invention. Preferably, the medium being used as the reactant is an alcohol or mercaptan when the base being used is an alkoxide or mercaptide. Other useful solvents are ketones, e.g., acetone, dioxane, acetonitrile, dialkyl formamides, e.g., dimethyl formamide and dialkyl sulfoxide, e.g. dimethyl sulfoxide, which are inert materials under the reaction conditions. Water dispersions of the liquid reactants and solvents can also be used in many cases.

In the practice of an embodiment of the invention using a liquid dispersing medium, the amount of solvent or diluent used should be adequate to permit substantially complete solution or dispersion of the reactants and products. The amount of liquid medium is not otherwise restricted. Preferably, the ratio of liquid to the solids is from about 10:1 to about 25:1 by weight based on the weight of haloperchlorylaromatic compound used.

Customary procedural steps can be used in carrying out the reaction according to the invention. When both the reactants are liquids, the haloperchlorylaromatic compound can be gradually added to the base in a chemically resistant vessel held at reaction temperature. When a solvent or dispersing liquid is used, the haloperchlorylaromatic compound is preferably placed in a suitable quantity of the liquid, and the other reactant is similarly placed in another quantity of the liquid. The two dilute liquid masses can then be brought together at a suitably controlled rate at operating temperature in a reaction vessel. The reaction vessel can be a batch-type reactor, a pipe system, or a cascade of reactor vessels arranged for continuous operation. In view of the explosive nature of pure perchlorylaromatic compounds under certain conditions of temperature, shock, or abrasion, batch sizes are preferably kept small in the absence of high dilution. A batch-type reaction at high dilution is preferred, with proper precautions being taken in any case.

The reaction is advantageously carried out in the temperature range from about 0° to about 150° C. The temperature range corresponding to the reflux temperature of the solvent, e.g. about 70° C. for methanol, is preferred. The reaction is advantageously carried out at reflux temperature whenever the reactant-liquid dispersing medium system is such that an upper temperature limit of about 150° C. is not greatly exceeded. As perchlorylaromatic compounds usually can be handled as safely as other similar compounds at moderate temperatures, but may decompose explosively at high temperatures, e.g., about 280° C., moderate reaction temperature ranges are preferably used.

Pressure is not critical and the reaction can be conducted at atmospheric, sub-atmospheric or super-atmospheric pressure. Atmospheric pressure is preferred because of its convenience, but pressures in the range from 100 mm. Hg to 300 p.s.i.g. can be advantageously used.

The reactants are held together at reaction temperature for a period of time sufficient for the displacement of the halogen of the haloperchlorylaromatic compound by the base to take place. In some cases, depending on the combination of reactants and operating conditions, the reaction will be completed in an hour or less. In other cases, as much as 24 or more hours may be required for completion of the reaction. Agitation of the reaction mass aids in removing heat of reaction and increasing the rate of reaction.

Recovery of the product from the reaction mass is carried out by usual well-known procedures. When the by-product is an inorganic halide, e.g., NaF, the reaction mass is preferably diluted with sufficient water, preferably acidified, to dissolve the salt and to cause separation of the organic layer containing the product. The latter layer is then withdrawn and further processed, as by distillation, preferably under vacuum, in the case of liquids, or by evaporation and crystallization in the case of solids, to recover the new ortho- or para-substituted perchlorylaromatic compound in a purified form.

The following examples are presented for the purpose of illustrating the invention, it being understood that the invention is not intended to be restricted to the specific illustrative examples and that other specific embodiments are included in the invention. The parts are by weight unless otherwise stated.

EXAMPLE 1

*Preparation of 4-Methoxyperchlorylbenzene*

Fourteen grams (0.078 mole) of 4-fluoroperchlorylbenzene were placed in a 1000 ml. 3-necked flask fitted with a thermowell, addition funnel and heating mantle. To this were added 154 ml. of 0.509 N sodium methoxide in methanol solution (equivalent to 0.078 mole of base). The mixture was then refluxed. After one hour an aliquot portion was removed and ether extracted. The aqueous layer was titrated for base to determine the extent of the reaction. The titre indicated an 82% complete reaction. The refluxing was continued for another hour. A further titration then revealed an 89% complete reaction. The reaction mixture was then diluted with 600 ml. of water and successively extracted with 200 ml., 100 ml., and 100 ml. portions of ethyl ether. The combined ether extracts were dried over anhydrous magnesium sulfate (15 g.) for two hours. The ether was then removed. The residual water-white liquid weighed 12.9 g. The liquid was then vacuum fractionated. 1.14 g. of unreacted 4-fluoroperchlorylbenzene was recovered. The main product distillation fraction had a B.P. of 70–72° C. at 0.1 mm. and weighed 6.5 g. The residual liquor weighed 1.6 g. and was also largely the desired product. Infrared analysis of the main product fraction showed that it had an intense band at 8.45 (1183 cm.$^{-1}$), due to $ClO_3$: aryl ether absorption at 7.92$\mu$ (1263 cm.$^{-1}$), and $CH_3$- absorption at 6.86$\mu$ (1458 cm.$^{-1}$).

Analysis for $C_7H_7ClO_4$—Calcd.: C, 44.1; H, 3.7; Cl, 18.64. Found: C, 44.41; H, 3.81; Cl, 18.50.

The nuclear molecular resonance spectrum of the product corresponded to that for 4-methoxyperchlorylbenzene.

EXAMPLE 2

*Preparation of 4-Hydrazinoperchlorylbenzene*

2.7 g. (0.072 mole) of 85% aqueous hydrazine solution (0.072 mole) were dissolved in 24 ml. of water and a solution of 4.0 g. (0.022 mole) of 4-fluoroperchlorylbenzene in 63 ml. of 95% ethyl alcohol were added. The mixture was refluxed for 19 hours and then cooled. The reaction mass was then diluted with 50 ml. of water and successively extracted with two 50 ml. portions of ethyl ether. The combined ether extracts were dried and evaporated. 1.3 g. of product was thus obtained as an oily residue having a refractive index $n_D^{25}=1.5710$. Infrared spectrum analysis confirmed that the product was 4-hydrazinoperchlorylbenzene.

EXAMPLE 3

*Preparation of 4-Thiophenylperchlorylbenzene*

A solution of 2.45 g. (0.022 mole) of benzenethiol in 100 ml. of 0.221 N sodium methoxide in methanol solution and 4 g. (0.22 mole) of 4-fluoroperchlorylbenzene were refluxed together for 21 hours and then cooled. On treatment as in Examples 1 and 2, above, 3.7 g. of an oily residue having a refractive index $n_D^{26}=1.5778$ was obtained. Infrared spectrum analysis confirmed that the product was 4-phenylthioperchlorylbenzene, i.e.,

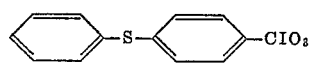

EXAMPLE 4

*Preparation of 4-Azidoperchlorylbenzene*

A solution of 4.0 g. of 4-fluoroperchlorylbenzene in 80 ml. of anhydrous acetone was refluxed in contact with 2.91 g. of sodium azide for 24 hours. The solids were filtered off. The residue was diluted with water and then ether extracted. The presence of 4-azidoperchlorylbenzene in the ether extract was confirmed by infrared spectroscopy. Typical perchloryl absorption and a strong azide absorption at 2110 cm.$^{-1}$ were found in the infrared spectrum.

EXAMPLE 5

*Preparation of 2-Methoxyperchlorylbenzene*

Following the procedure of Example 1, 18.6 parts of 2-fluoroperchlorylbenzene are reacted with 5 parts of sodium methoxide dissolved in 165 parts of methanol at reflux temperature. When the titration for unreacted base shows that the consumption of the sodium methoxide is nearly completed, the reaction mass is diluted with about 800 parts of water made slightly acid with HCl. The diluted mass is extracted with several portions of ethyl ether. 2-methoxyperchlorylbenzene is recovered as product upon evaporation of the ether extracts.

EXAMPLE 6

*Preparation of 4-Hydroxyperchlorylbenzene*

Twenty parts of 4-chloroperchlorylbenzene are dissolved in 200 ml. of acetone and refluxed in contact with 4 parts of NaOH in the form of a 50% NaOH solution in water for 24 hours. The reaction mass is diluted with 100 ml. of water made slightly acid with HCl. The product, 4-hydroxyperchlorylbenzene, is recovered from the reaction mass as an ether extract. The ether is then evaporated leaving the product in crystalline form.

In a similar way, following the procedures given in Examples 2, 3, 4, and 5, respectively, one can prepare 2-hydrazinoperchlorylbenzene, 2-thiophenylperchlorylbenzene, 2-azidoperchlorylbenzene and 2-hydroxyperchlorylbenzene.

4-methoxyperchlorylbenzene, 4-hydrazinoperchlorylbenzene, 4-thiophenylperchlorylbenzene, 4-hydroxyperchlorylbenzene, 4-azidoperchlorylbenzene and the corresponding ortho compounds each possess the explosive characteristics of perchlorylbenzene. Each of the compounds can be exploded by heat, friction, or shock. The compounds are useful as explosive materials either alone or in combination with other materials commonly used in explosive or flame-producing compositions.

Many different embodiments of this invention may be made without departing from the scope and spirit of it, and it is to be understood that my invention includes also such embodiments and is not limited by the above description.

I claim:

1. A perchlorylbenzene compound selected from the group consisting of 4-methoxyperchlorylbenzene, 4-phenylthioperchlorylbenzene, 4-azidoperchlorylbenzene and 4-hydrazinoperchlorylbenzene.
2. 4-methoxyperchlorylbenzene.
3. 4-phenylthioperchlorylbenzene.
4. 4-azidoperchlorylbenzene.
5. 4-hydrazinoperchlorylbenzene.
6. A method for replacing the halogen atom in a compound selected from the group consisting of an orthohaloperchlorylbenzene and a parahaloperchlorylbenzene with the electronegative group of a base which consists essentially of reacting the haloperchlorylbenzene compound under strongly alkaline conditions at a temperature below 280° C. with up to about a stoichiometric amount of a Lewis base.
7. The method according to claim 6 in which the base is an alkali metal alkoxide.
8. The method according to claim 6 in which the halogen is in ortho position.
9. The method according to claim 6 in which the halogen is in para position.

References Cited in the file of this patent

Moeller: Inorganic Chemistry, pages 308, 309, 321, 323, 326–7 and 329 (1952).